(12) United States Patent
Barbosa

(10) Patent No.: US 6,730,160 B2  
(45) Date of Patent: May 4, 2004

(54) METHOD OF MANUFACTURE OF STRUCTURAL INSULATING BUILDING MATERIALS

(76) Inventor: Sergio Barbosa, Juarez #512-B Ote, Centro, Cadereyta, Nuevo Leon (MX)

( * ) Notice: Subject to any disclaimer, the term of this patent is extended or adjusted under 35 U.S.C. 154(b) by 0 days.

(21) Appl. No.: 09/793,459

(22) Filed: Feb. 26, 2001

(65) Prior Publication Data

US 2002/0117771 A1 Aug. 29, 2002

(51) Int. Cl.⁷ .................... C04B 18/24; B28B 1/50; B28B 1/52; B28B 19/00
(52) U.S. Cl. ............... 106/697; 106/677; 106/795; 264/35; 264/257; 264/333
(58) Field of Search .......... 264/35, 333, 257; 106/677, 697, 795

(56) References Cited

U.S. PATENT DOCUMENTS

| | | | | |
|---|---|---|---|---|
| 2,196,277 A | * | 4/1940 | Schorger et al. | 106/164.3 |
| 2,247,204 A | * | 6/1941 | Schorger et al. | 106/164.5 |
| 2,283,820 A | * | 5/1942 | Schorger et al. | 106/164.5 |
| 2,708,637 A | * | 5/1955 | Glab | 106/164.5 |
| 3,092,537 A | * | 6/1963 | Brandts | 162/159 |
| 3,278,322 A | * | 10/1966 | Harkins, Jr. et al. | 427/278 |
| 3,518,799 A | | 7/1970 | Bachner | |
| 3,555,757 A | | 1/1971 | Volent | |
| 3,740,911 A | | 6/1973 | O'Leary | |
| 3,949,037 A | | 4/1976 | Volent | |
| 4,226,908 A | * | 10/1980 | Yoshino et al. | 252/62 |
| 4,349,588 A | | 9/1982 | Schiffer | |
| 4,407,104 A | | 10/1983 | Francis | |
| 4,963,305 A | | 10/1990 | Cromrich et al. | |
| 5,496,881 A | | 3/1996 | Annemaier et al. | |
| 5,505,774 A | * | 4/1996 | Manning | 106/697 |
| 5,526,630 A | | 6/1996 | Francis et al. | |
| 5,538,553 A | * | 7/1996 | Burgand | 106/697 |
| 5,611,882 A | | 3/1997 | Riebel et al. | |
| 5,782,970 A | * | 7/1998 | Zawada | 106/638 |

* cited by examiner

Primary Examiner—Michael Colaianni  
Assistant Examiner—Michael I. Poe  
(74) Attorney, Agent, or Firm—Jackson Walker L.L.P.

(57) ABSTRACT

A fire retardant building material composed of a mixture of water and cellulose fibers, both of which can be comprised of readily available materials at the job site, such as the available water supply or natural water and scrap shredded paper, including newspaper or other discarded paper or cardboard materials. The water and cellulose fiber is mixed to form a slurry and calcium hydroxide, alumina, salt and ammonia are added. Pigments and aggregates may be added for appearance.

17 Claims, No Drawings

METHOD OF MANUFACTURE OF STRUCTURAL INSULATING BUILDING MATERIALS

BACKGROUND OF INVENTION

1. Field of Invention

The subject invention is generally related to asbestos-free, cellulose-based insulating materials and is specifically directed to an insulating material that can be cured to form a structural building material or an insulating layer on site at room temperature.

2. Description of the Prior Art

In the building industry in particular, the structural elements used, such as for example ceilings, walls, partitions, girders and columns and the like, must have adequate fire resistance. To this end, there are legal provisions in many local and national codes that stipulate the period for which the structural elements have to withstand a fire. The walls, installed materials and even sealed openings in such structural elements (for cables and slots for tubes or joints) have to show the same fire resistance as the structural elements in which they are situated. Accordingly, a number of fireproofing compounds are used, for example, to coat the structural elements to make them fireproof or to increase the fire resistance of the sealing systems for the openings.

The sheaths and insulations of electrical cables and plastic pipes consist of inflammable materials which, after ignition, can spread the fire very quickly and which, in addition, conceal the danger of filling workshops and escape routes with smoke and, at the same time, of forming corrosive or toxic combustion products. These risks can generally be minimized by fireproof coatings.

DE-PS 20 65 117 describes a fireproofing compound which contains chlorinated hydrocarbons, antimony trioxide and asbestos fibers in addition to other substances in an aqueous polymer emulsion. This compound is used as a protective coating for electrical cables. In the event of fire, however, the chlorine-containing compound gives off not only chlorine compounds, but also hydrogen chloride gas that is both toxic and highly corrosive. In addition, the fireproofing compound described in DE-OS 20 65 117 contains antimony trioxide which is regarded as a carcinogenic substance and also asbestos fibers which are now known to have a health-damaging effect.

DE-PS 20 39 969 also describes a fireproofing compound containing chlorinated hydrocarbons. The compound in question may also contain asbestos and antimony compounds as further components. Accordingly, the fireproofing compound according to DE-PS 20 39 969 also has the unfavorable properties mentioned above and shows adverse health-damaging effects.

Although the fireproofing compound disclosed in DE-OS 27 24 604 avoids the use of asbestos fibers, it still contains chlorinated hydrocarbons and antimony trioxide. Accordingly, the fireproofing compound according to this document also shows unfavorable health-damaging effects.

The use of a fire-retarding compound for coating electrical cables and lining cable runways is described in DE-PS 28 44 693. The problem addressed by the invention to which this document relates was to modify the fireproofing compound described in DE-PS 20 39 969 in such a way that asbestos need no longer be used. However, the compound used in accordance with DE-PS 28 44 693 still contains an organic halogen compound and, optionally, antimony compound which leads to the disadvantages already described.

Halogen-free fireproofing compounds are also known from the prior art, but contain large quantities of health-damaging antimony compounds, such as antimony trioxide for example. Despite a high content of antimony compounds, these known fireproofing compounds show poor fireproofing properties. For example, cables with a halogen-free sheath and a halogen-free insulation, such as telephone cables with PE sheaths and insulations, cannot be protected with a commercially available product of this type in such a way that the requirements of DIN 4102, Part 1 (Class B1 Building Materials—Flame-Resistant Building Materials) are satisfied.

Because of the risks associated with fires involving PVC cables (heavy smoke generation, evolution of toxic and corrosive gases), numerous attempts have also been made to replace PVC by polyolefins or by halogen-free elastomers. However, the fire risks attending these new types of cables are often no less than those attending PVC cables and can even be greater.

The search for an insulating and fireproofing compound that is less hazardous to the environment and to human health than known fireproofing compounds has resulted in numerous new technologies. It is required that the dangers associated with the insulating material be minimized while the same time maintaining an effective structural, insulating and fireproofing integrity.

One example of a cellulose based material is shown and described in U.S. Pat. No. 5,496,881, entitled: "Composition for Forming Fireproof Coatings and Caulking and a Method of Use", issued to Annemaier, et al on Mar. 3, 1996. This patent teaches an aqueous composition for forming fireproof coatings and caulking. The composition is halogen, asbestos and antimony-free. The composition contains 5–20% by weight of a binder resin; 10–60% by weight of a particulate flame proofing agent; 0.2 to 27.5% by weight of non-asbestos inorganic fibers with an average length of 300 micron; 0.1 to 10% by weight of a plasticizer; and water.

Other materials, such as board stock and structural materials have also been developed using a cellulose mixture. U.S. Pat. No. 5,611,882, entitled: "Board Stock and Method of Manufacture from Recycled Paper", issued to Riebel, et al, on Mar. 18, 1997, discloses a cellulose mixture including a protein based adhesive binder and colorant. The mixture can be compression molded or extruded and upon curing in the presence of microwave or radio frequency energy or in thermally controlled appliance, produces board or shape formed stock. The produced stock exhibits colorations and a grain pattern comparable to natural stone. Unlike stone, the material exhibits a lightweight, low density, structural rigidity and ready machinability. A preferred method includes admixing separate, colorized batches of feedstock, each feedstock includes shredded waste newsprint, soybean flour, water and a colorant; reducing the moisture content of each feedstock or a proportioned admixture of several feedstocks, such as by air drying or compressing or performing the admixture in the presence of heat; compacting the admixture to final shape; and curing the shaped material. Final forming and finishing apparatus complete the process.

In addition the need for inexpensive, useful and versatile structural materials continues to plague the building industry, particularly where costs of materials and unavailability of a transportation infrastructure or lack of skilled labor make building of new structures and repair of older structures both difficult and expensive. Moreover, these conditions generally exists in areas where costs is a significant issue to the inhabitants. As an example, while of superior durability, face brick, cut stone and/or floor tile, manufactured of materials which are permanent and non-deteriorating such as fired clay or concrete or natural stone, are often rejected in such regions even though such materials are universally accepted. Reasons for such acceptance include proven longevity, reasonable and permanent closure and resistance to the elements of weather, incombustibility and general appreciation of the styles and colors available which enhance the individual structures on which the face brick, cut stone and/or floor tile is installed. However, the weight, necessity of skilled labor for installation and cost of the installed face brick, cut stone and/or floor tile system have been primary reasons for not using or even considering usage of brick, cut stone and/or floor tile except those regions where usage is presumed as normal or preferred, or where style and visual effect have been primary considerations.

Often face brick, cut stone and/or floor tile cannot be installed on an existing interior wall or floor without significant structural modifications because of the weight of the product. Still another barrier to use is that only professional masons are capable of proper installation of the material.

Over the years the industry has tried to overcome these objections and numerous ideas have been published to overcome these weight and cost issues. The problems associated with weight have been addressed modifying the design of the products and constructing the products with new, lighter-weight materials.

Specifically, the industry has concentrated on decreasing the volume of material used in the manufacturing of each individual brick, stone or tile thereby reducing the attendant weight. The method of extruding holes parallel with respect to the face of the brick is universally known as prior art. The minimum weight achieved by this means, while maintaining sufficient strengths, has remained virtually constant for centuries. This has not lessened issues where a wall-facing product is too heavy for many uses. Teachings include that by Gerald T. Francis in U.S. Pat. No. 4,407,104 (1983), which has, as the primary focus, thin bricks adhesively attached to an extruded polystyrene foam backing panel and each panel joined to the wall with clips which protrude through the joints in the foam panel to provide mechanical attachment to the brick joint mortar subsequently applied. The problem common with adhesives is still extant with this teaching. In addition, in order to achieve a finished wall surface, the mortar joints must be filled manually.

Another teaching is disclosed in U.S. Pat. No. 5,526,630 issued to Steven R. Francis, et al (1996) wherein a formed panel incorporates channels for accepting preformed thin brick tiles frictionally inserted into said channels. There is an additional device, which protrudes from the outer surface of the panel into a space between the individual brick tiles for providing a mechanical attachment of the panel to the wall and for forming a positive attachment to joint mortar that is subsequently applied. This teaches a frictional fit of the individual thin brick tiles to the underlying panel which overcomes the adhesive problem, but introduces another problem by depending primarily on the thin mortar joints for stability of the wall facing.

Still another teaching is contained in U.S. Pat. No. 4,349,588 issued to Henry Schiffer (1982) where a monolific layer of modified cementious mortar is troweled onto an existing surface, subsequently scored, sealed and grouted to appear like brick or cut stone. The disadvantage of this teaching is that it is very labor intensive, requires a multitude of separate steps to accomplish, does not resist cracking because of the monolific coating, requires someone skilled in the art to install and would be difficult to approach a visual replica of the material that it attempts to emulate.

Various materials or combinations of materials have been utilized to achieve a lighter weight brick or cut stone. A common method has been taught by G. L. Bachner in U.S. Pat. No. 3,518,799 (1970) and S. C. Volent in U.S. Pat. Nos. 3,555,757 and 3,949,037 (1967 and 1976 respectively) where a brick, simulated or real, is either cut, pressed or extruded to a thickness of about one-half inch (½") or less and then attaching it to the structure by utilizing adhesives. This has not been successful, especially on exterior surfaces because the adhesives are not good enough to provide permanent attachment and because the underlying surfaces must be absolutely sound, planar and without any presence of moisture behind or in them.

A variation of this concept is taught by James D. O'Leary in U.S. Pat. No. 3,740,911 (1973) where the thin bricks are adhesively bonded using a "resin adhesive" to a substrate, which is subsequently attached mechanically to the wall. A further variation of these attempts is taught by Chromic, et al in U.S. Pat. No. 4,963,305 where a lightweight, insulating facing brick is provided with a first outer layer formed from conventional bricking clay and a second insulating layer formed from a combination of clay and expanded vermiculite.

Although these approaches do indeed result in a lightweight or lighter weight wall facing material, other conceptual and actual problems arise in their usage. For instance, the current state of the art in the plastics industry does not allow for a material that is not attacked by Ultra-Violet (UV) rays from the sun in the long term, thereby obviating any possibility of true permanence as a wall facing product when compared to concrete or clay face brick, cut stone and/or floor tile. Additionally, plastics are expensive and do not present a visual equality to the natural materials which they seek to emulate—they look "plastic". The dual composite teaching must still utilize expensive and increasingly difficult to find skilled masons to accomplish installation. In the concrete brick industry, various attempts have been made to utilize lighter weight materials, such as expanded shale or clay, to replace some of the normal graded sand as aggregate in the concrete mix. The resulting brick weighs less (about two-thirds the weight) than a normal aggregate mix, but is not as strong and is more absorbent, thereby making it more difficult to use.

The second primary issue is that of costs relating to initial manufacturing, transportation and installation. Initial costs of concrete brick, cut stone and/or floor tile are competitive. However, the costs of re-bracing an existing structure compel many to reject the use of brick, tile and/or stone to re-face the walls or floors (interior or exterior). Also, masons required to lay common brick, floor tile and/or cut stone who are skilled workers who demand high wages. The capital costs to install a manufacturing facility for the extrusion or molding of concrete face brick, floor tile and/or cut stone are considerable. A significant portion of the cost is in the purchase of the forms on which the brick, tile or stone are extruded. Additionally, if more than one size of brick, tile or stone is desired to be produced, the additional forms on which to extrude that size must be purchased. Variations in thickness or any other dimension are impossible because of the shape imposed, in major part, by the forms and by thicknesses necessary to achieve adequate installed strengths. The weight of the finished product limits the effective reasonable shipping radius, limiting the market area to about a 200-mile radius from the manufacturing facility.

SUMMARY OF INVENTION

The subject invention is directed to a new material composition that can be made on site, largely from available materials, without special tools or processes. The material cures through natural evaporation, without the application of artificial heat. The cured material has been tested to withstand a direct flame in excess of 1500° C. and is durable as most lightweight aggregate materials of similar thickness when formed into a structural panel or product. The material may be diluted by water as it is mixed and is suitable for spray application. The material has been successfully used as an exterior wall coating or a roof coating and has shown very desirable increase in "R" factor insulation ratings as well as providing a good fire retardant layer.

In the preferred embodiment, the compound material of the subject invention is a mixture of water and cellulose fibers, both of which can be comprised of readily available materials at the job site, such as the available water supply or natural water and scrap shredded paper, including newspaper or other discarded paper or cardboard materials. The water and cellulose fiber is mixed to form a slurry. No specific ratio of water to fiber is required and this is primarily dependent on the application. If the material is to be spray applied then the slurry must be thinner. Where structural material is being created a thicker slurry is desirable primarily because it will lessen the cure period. The mixture may be made to a wet cement-type consistency as well and may be troweled onto a surface.

The water/cellulose slurry is well mixed to assure that the cellulose fibers are saturated with water. Typically, suitable mixing can be achieved in five to ten liter quantities using a hand mixer such as the blade of a shovel or hoe. Once the slurry is thoroughly mixed, the chemicals are added to provide the structural and fire retardant properties. In the preferred embodiment, the basic mixture comprises the following dry components:

- 6 kilograms of cellulose fibers
- 1 liter of ammonia (NH4)
- 1 liter of alumina
- 1 liter of salt (NaCl)
- 25 kilograms of calcium hydroxide(CaOH)
- 180 liters of water.

The cellulose is mixed with the water and the other components are then added in no particular order. Once mixed, the material is ready to use in its wet form as a troweled product, rolled product or sprayed product. It can also be placed in molds or forms to cure to a finished structural product such as a brick or a wall panel. When placed in a sealed container in the wet state, the product has a substantial, although undetermined, shelf life.

Where a more durable product is desired, for example as a replacement for stucco on the exterior of a building, an aggregate may be added. In the above formula, up to 18 liters of aggregate has been added with desirable results. A sand aggregate may also be added to create a desired texturized appearance. Three to four liters have been added with desirable results being achieved.

It is, therefore, and object and feature of the invention to provide a method for making a lightweight, inexpensive fire retardant coating that is non-toxic.

It is an additional object and feature of the invention to provide a method for making fire-resistant material that may be made on site without special tools.

It is another object and feature of the subject invention to provide a method for making a structural material that is non-toxic and may be molded or formed on site.

It is also an object and feature of the invention to provide a method for making a construction material that may be used as a coating by troweling or spreading, rolling, or spraying the material on in a wet form and allowing it to dry at ambient temperature.

It is a further object and feature of the subject invention to provide a method for making a coating material that may be stored in liquid form for long periods and may be diluted with water at room ambient temperatures.

Other objects and features of the invention will be readily apparent from the following detailed description of the invention.

DESCRIPTION OF THE PREFERRED EMBODIMENT

The subject invention is directed to the method of making a non-toxic building material from salts, calcium hydroxide, ammonia, cellulose fibers and water. The material may be mixed on site using common hand tools, such as a bucket and a shovel or hoe. The material is of superior rigidity, and when 3 centimeters thick will withstand temperatures of over 1500° C. The material may be formed or molded into a structural member by pouring into mold or form at ambient temperature and allowing to dry without use of artificial heat. The material may be diluted with water for spraying or roller applications and may be used in a thicker, mud-like consistency when spread with a trowel or the like. The material is very useful for repairing or replacing stucco exteriors, as an example.

In the preferred form, the material composition is cellulose fibers, ammonia, salt and calcium hydroxide mixed in water. Other materials may be added to include texturizing for appearance, such as an aggregate, stone, vermiculite or the like. Water-soluble pigments such as latex paint may be added for colorization.

In the preferred embodiment, the compound material of the subject invention is a mixture of water and cellulose fibers, both of which can be comprised of readily available materials at the job site, such as the available water supply or natural water and scrap shredded paper, including newspaper or other discarded paper or cardboard materials. The water and cellulose fiber is mixed to form a slurry. No specific ratio of water to fiber is required and this is primarily dependent on the application. If the material is to be spray applied then the slurry must be thinner. Where structural material is being created a thicker slurry is desirable primarily because it will lessen the cure period. The mixture may be made to a wet cement-type consistency as well and may be troweled onto a surface. It should be understood that "wet cement-type consistency" is used in a descriptive sense only, in that the building material of the subject invention does not utilize cement as a component.

The water/cellulose slurry is well mixed to assure that the cellulose fibers are saturated with water. Typically, suitable mixing can be achieved in five to ten liter quantities using a hand mixer such as the blade of a shovel or hoe. Once the slurry is thoroughly mixed, the chemicals are added to provide the structural and fire retardant properties. In the preferred embodiment, the basic mixture comprises the following dry components:

- 6 kilograms of cellulose fibers
- 1 liter of ammonia (NH4)
- 1 liter of alumina
- 1 liter of salt (NaCl)
- 25 kilograms of calcium hydroxide (CaOH)
- 180 liters of water.

The cellulose is mixed with the water and the other components are then added in no particular order. Once mixed, the material is ready to use in its wet form as a troweled product, rolled product or sprayed product. It can also be placed in molds or forms to cure to a finished structural product such as a brick or a wall panel. When placed in a sealed container in the wet state, the product has a substantial, although undetermined, shelf life.

Where a more durable product is desired, for example as a replacement for stucco on the exterior of a building, an aggregate may be added. In the above formula, up to 18 liters of aggregate has been added with desirable results. A sand aggregate may also be added to create a desired texturized appearance. Three to four liters have been added with desirable results being achieved.

While certain features and embodiments of the invention have been described in detail herein, it should be understood that the invention includes all enhancements and modifications within the scope and spirit of the following claims.

What is claimed is:

1. A method of making a construction material comprising:
   a. Mixing water and cellulose fibers to form a slurry;
   b. Mixing salt into the slurry;
   c. Mixing ammonia into the slurry;
   d. Mixing calcium hydroxide into the slurry; and
   e. Mixing alumina into the slurry,
   wherein the ratio of calcium hydroxide to salt is approximately 25 to 1, by weight, and the ratio of calcium hydroxide to ammonia is approximately 25 to 1, by weight.

2. The method of claim 1, wherein steps b, c, d and e may be performed in any order.

3. The method of claim 1, including the step of pouring the combination created by steps a, b, c, d and e into a form and drying at ambient temperature.

4. The method of claim 1, including the step of pouring the combination created by steps a, b, c, d and e into a mold and drying at ambient temperature.

5. The method of claim 1, including the step of mixing an aggregate into the slurry.

6. The method of claim 1, including the step of mixing a pigment into the slurry.

7. The method of claim 1, wherein the ratio of calcium hydroxide to cellulose fiber is approximately 4 to 1, by weight.

8. The method of claim 1, wherein there is included 6 kilograms of cellulose fibers for every 25 kilograms of calcium.

9. The method of claim 1, wherein the ratio of calcium hydroxide to alumina is approximately 25 to 1, by weight.

10. The method of claim 1, wherein there are approximately equal parts of salt, ammonia and alumina, by weight.

11. The method of claim 1, wherein there are approximately equal parts of salt, ammonia and alumina by volume.

12. The method of claim 1 wherein the various components comprise approximately the following formula:
    6 kilogram of cellulose fibers;
    1 liter of ammonia ($NH_4$);
    1 liter of alumina;
    1 liter of salt (NaCl);
    25 kilograms of calcium hydroxide (CaOH); and
    180 liters of water.

13. The method of claim 1, including the step of applying the combination created by steps a, b, c, d and e onto a surface to form a coating.

14. The method of claim 13, wherein the coating is sprayed onto the surface.

15. The method of claim 13, wherein the coating is spread by a trowel onto the surface.

16. The method of claim 13, wherein the coating is rolled onto the surface.

17. A method of making a construction material comprising:
    a. Mixing water and cellulose fibers to form a slurry;
    b. Mixing salt into the slurry;
    c. Mixing ammonia into the slurry;
    d. Mixing calcium hydroxide into the slurry; and
    e. Mixing alumina into the slurry,
    wherein the various components comprise approximately the following formula:
    6 kilogram of cellulose fibers;
    1 liter of ammonia ($NH_4$);
    1 liter of alumina;
    1 liter of salt (NaCl);
    25 kilograms of calcium hydroxide (CaOH); and
    180 liters of water.

* * * * *